Aug. 19, 1958    A. J. TAYLOR    2,848,242
ROLLER AND BRAKE ASSEMBLY
Filed Oct. 28, 1955

INVENTOR:
Allan J. Taylor
By Hubert E. Metcalf
His Patent Attorney

United States Patent Office 2,848,242
Patented Aug. 19, 1958

2,848,242

ROLLER AND BRAKE ASSEMBLY

Allan J. Taylor, Pacific Palisades, Calif., assignor to Northrop Aircraft, Inc., Hawthorne, Calif., a corporation of California Application October 28, 1955, Serial No. 543,506

4 Claims. (Cl. 280—29)

This invention relates to material handling equipment and more particularly to a roller assembly facilitating the transfer of components from one dolly having side rails to another dolly of similar construction or like equipment.

Frequently heavy pieces of equipment, e. g. aircraft jet engines and the like, must be transported by air from operational or advanced bases to maintenance bases for repairs and other purposes. In the removal of jet engines and other equipment from an aircraft an elevating type dolly is normally utilized in performing this function. During the transfer between the aforementioned bases the engine and dolly are usually transported as a unit. Such a combination renders the equipment (engine) readily stowable and facilitates the transportation thereof at the points of origin and destination. The characteristics of an elevating type dolly, however, render it unsuitable for transportation purposes. Accordingly it is customary to transfer the equipment, at the advanced base, from the supporting rails of an elevating dolly to the supporting rails of a dolly of lighter construction if at all possible.

The transfer of heavy equipment from one dolly to another presents a troublesome and difficult problem particularly at operational and advanced bases due to the lack of adequate handling facilities at these locations.

Accordingly it is an object of the present invention to provide means facilitating the transfer of heavy equipment quickly and easily from one dolly to another.

Another object is to provide a roller assembly by means of which heavy equipment may be transferred from corresponding horizontally positioned structural members of one dolly to another without perfect alignment of the members in a common horizontal plane.

Another object is to provide a roller assembly by means of which heavy equipment may be transferred from one dolly to another and which functions as either a right or left hand unit.

Another object is to provide a roller assembly, by means of which heavy equipment may be transferred from one dolly to another, and which incorporates braking means.

Another object is to provide a roller assembly, by means of which heavy equipment may be transferred from one dolly to another, which is simple in design and construction, economical to manufacture, and which is substantially foolproof in operation.

Although the characteristic features are particularly pointed out in the appended claims, the invention itself, also the manner in which it may be carried out, will be better understood by referring to the following description taken in connection with the accompanying drawings forming a part of this application and in which:

Figure 1:
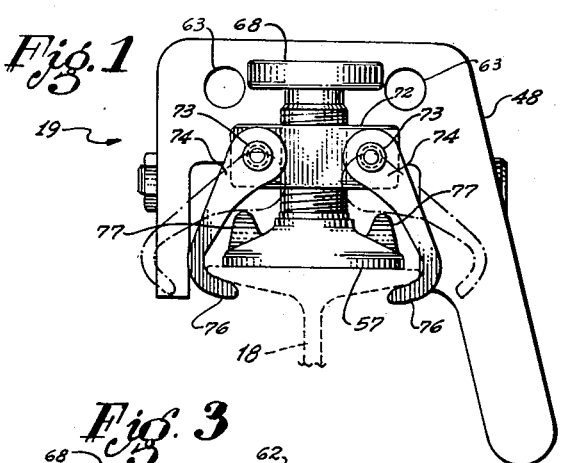
Figure 1 is an end elevational view of the roller-brake assembly as disclosed herein.

Referring to the drawing, the roller assembly as disclosed herein is indicated in its entirety by the numeral 19 and consists of a substantially U-shaped housing 48 the leg portions 49 and 51 of which are spaced apart sufficiently to allow the latter members to span the flange portion of an I-beam member 18. Rotatably mounted in the housing 48 is a cylindrical roller member 51. The roller is fixedly secured to a shaft 52, the latter being rotatably mounted in the legs 49 and 51 by means of bearings 53. Bushings 54 are mounted on the shaft 52 on each side of the roller and between the latter and the legs of the housing 48.

A braking member 56, generally of rectangular configuration in plan view, is provided with a braking shoe portion 60 having a plane surface constituting a braking surface 57 and which is located at one end of the member 56. The braking member 56 is substantially the same width as the flange portions of the members 18 and, in its assembled position in the housing 48, extends approximately equal distances beyond each end of the housing 48. The braking member is further characterized by having intermediate upstanding side portions 58 spaced to span the roller 51 and pivotally mounted on the bushings 54. The base portion of the member 56 defines an opening 59 located at the mid-portion of the brake member. The roller 51, shaft 52, and brake member 56 are mounted in the housing so that the cylindrical surface of the roller and the surface 57 have substantially a tangential relationship. The lower surface of the end of the braking member, that is the end opposite the surface 57, is positioned slightly above the surface 57 when the lower surface of the brake means 56 is in a horizontal position. This construction allows the member 56 to rock slightly at such times as the assembly 19 is mounted on the member 18 and therefore allows the roller 51 to rest firmly on the member 18.

The housing 48 is provided with replaceable guide strips 61 which bear against the edges of the upper flange portion of the member 18. Bores 62 and 63 are provided in the upper portion of the housing 48 to provide means whereby suitable supporting pads (not shown) may be attached to the assembly 19. A pair of apertures 64, adapted to receive lashing cables or the like, are provided in the out-board leg 49 of the housing 48.

Provided in the end of the shaft 52, which is located adjacent the out-board leg 49 and extending axially of the shaft 52, is a bore 66 which is either square or hexagonal in cross-section. This bore receives the end of a mating tool and provides means whereby the roller 51 may be rotated.

Figure 2:
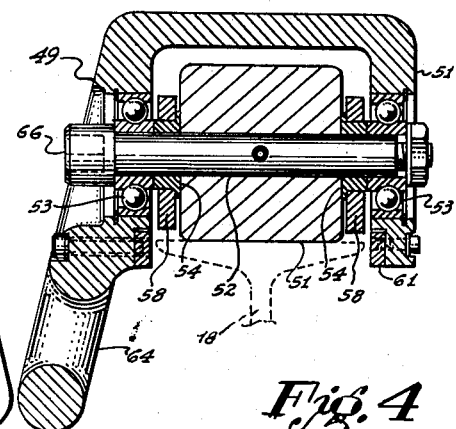
Figures 2 and 3 are lateral and longitudinal cross-sectional views, respectively, of the roller-brake assembly of Figure 1.
Figure 3:
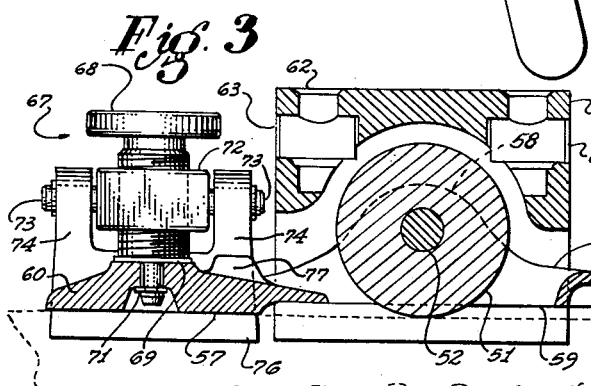

Provided on the braking shoe portion of the member 56 is a locking assembly 67. This assembly consists of a bolt-like member 68 which is rotatably mounted in a vertical attitude on the shoe portion 60. The member 68 is formed with a shoulder 69 which bears on an upper surface of the shoe portion 60 and has a cylindrical portion of reduced diameter extending through the shoe and terminates in a recess formed therein. A retaining ring 71 maintains the bolt member 68 in position on the shoe portion 60. A cross member 72 is provided with a threaded bore at its mid-point which in its assembled position engages the threaded portion of the member 68. Extending from each end of the cross member are two pairs of trunnion-like supports 73 adapted to pivotally receive hook-like elements 74. The hook elements are shaped, as shown in Figures 1 and 2, so that their hook portions 76 contact the lower surfaces of the upper flange of the member 18 at such times as the cross-member 72 is caused to move a predetermined distance in an upwardly direction on the bolt member 68.

Additional upward movement of the member 72 urges the surface 57 into firm contacting relationship with the upper flange surface of the member 18. Thus an effective braking facility is provided for the assembly 19 precluding the movement thereof in a longitudinal direction on the member 18. Upstanding lugs 77 are provided on the upper surface of the shoe portion 60 which contact the hook members 74 as the cross-member 72 is lowered. During this lowering movement the lugs 77 function to pivot the members 74 in an outwardly direction about their pivotal axis on the cross-member 72. Upon sufficient lowering of the cross-member 72 the hook members 74 are moved to a position indicated by phantom construction in Figure 1 permitting the removal of the assembly 19 from the member 18. Upon raising of the cross-member 72 the members 74 will again clear the lugs 77 allowing their hooked portions 76 to assume a position below the upper flange of the member 18.

Figure 4:
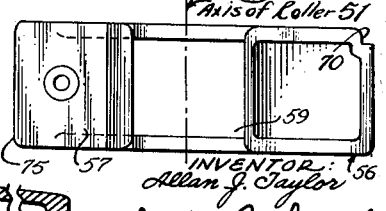
Figure 4 is a bottom view of the roller-brake assembly of Figure 1.

As shown in Figure 4, diagonally opposite corners 70 and 75 of the brake member 56 are positioned equal distances from the axes of the roller 51. This relationship may be accomplished by removing a portion of the corner 70 if necessary. With the assembly 19 in position on the member 18 the corners 70 and 75 will contact pins (not shown) which are located in the upper flange of the member 18. This construction permits the assemblies 19 to be used interchangeably as right or left hand units.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A roller brake assembly, comprising: a housing which is substantially U-shaped in cross-section; a shaft rotatably mounted in and extending between the sides of said housing; a roller mounted on said shaft; a brake member pivotally mounted on said shaft and which includes a plate-like portion having a plane surface in near tangential relationship with respect to said roller; threaded means rotatably attached to said brake member and mounted to extend from said plate-like portion on the side thereof opposite said plane surface; a pair of locking members having hooked outer ends and apertured inner ends; and said locking members being pivotally attached by their inner ends to said threaded means in depending relation with said hooked ends in opposing relation and normally positioned below said plane surface so that upon rotation of said threaded means relative movement is imparted to said locking members relative to said brake member.

2. Apparatus as set forth in claim 1: further characterized in that said threaded means includes a bolt-like member rotation of which in one direction results in moving said locking members vertically between a first position in which said hooked ends are spaced a predetermined vertical distance below said plane surface and a second position in which said hooked ends are spaced a vertical distance exceeding said predetermined vertical distance below said plane surface.

3. Apparatus as set forth in claim 2: including a pair of lugs formed on said plate-like portion and in which further rotary movement of said bolt-like member in said one direction results in said locking means moving to a third position and in so doing contact said lugs which function to move said hooked ends laterally and outboard with respect to said plane surface.

4. Apparatus as set forth in claim 1: further characterized in that said brake member extends on each side of said roller and is provided with end portions on each side of said roller which are equal distances from the axis of said roller.

References Cited in the file of this patent

UNITED STATES PATENTS

| | | |
|---|---|---|
| 336,117 | Jessop | Feb. 16, 1886 |
| 1,112,520 | Burtosky | Oct. 6, 1914 |
| 1,676,508 | Vanderveld | July 10, 1928 |
| 1,915,883 | Fager | June 27, 1933 |
| 2,045,566 | Berg | June 30, 1936 |